(No Model.)  4 Sheets—Sheet 1.

H. D. WINTON.
ROTARY WATER METER.

No. 423,298.  Patented Mar. 11, 1890.

WITNESSES
J. M. Dolan
A. P. Porter

INVENTOR
Henry D. Winton
by his attys
Archer & Raymond (No Model.)

H. D. WINTON.
ROTARY WATER METER.

No. 423,298. Patented Mar. 11, 1890.

WITNESSES.
J. M. Dolan
A. P. Porte

INVENTOR
Henry D. Winton
by his atty
Clarke & Raymond (No Model.) 4 Sheets—Sheet 3.

H. D. WINTON.
ROTARY WATER METER.

No. 423,298. Patented Mar. 11, 1890.

WITNESSES.
J. M. Dolan
A. P. Porter

INVENTOR.
Henry D. Winton
by his attys
Clarke & Raymond (No Model.)  4 Sheets—Sheet 4.

H. D. WINTON.
ROTARY WATER METER.

No. 423,298. Patented Mar. 11, 1890.

WITNESSES.
J. M. Dolan
A. P. Porter

INVENTOR.
Henry D. Winton
by his attys
Clarke & Raymond

UNITED STATES PATENT OFFICE.

HENRY D. WINTON, OF WELLESLEY, MASSACHUSETTS, ASSIGNOR TO THE HERSEY METER COMPANY, OF PORTLAND, MAINE.

ROTARY WATER-METER.

SPECIFICATION forming part of Letters Patent No. 423,298, dated March 11, 1890.

Application filed October 7, 1889. Serial No. 326,242. (No model.)

*To all whom it may concern:*

Be it known that I, HENRY D. WINTON, of Wellesley, in the county of Norfolk and State of Massachusetts, a citizen of the United States, have invented a new and useful Improvement in Water-Meters, of which the following is a full, clear, and exact description, reference being had to the accompanying drawings, forming a part of this specification, in explaining its nature.

The invention is represented as embodied in an improvement on the meter described in Patent Reissue No. 10,788, dated November 2, 1886, to James A. Tilden.
Certain waters passed through meters have a tendency to deposit solid matter upon the metal walls, plates, or sections of the meter, and thereby cause in the running parts of the meter a friction which interferes with their proper operation and reliability. Such meters, however, do not deposit such solid matter upon rubber or rubber compounds. In the meter in question the wall of the piston-chamber and the piston are made of hard vulcanized rubber or rubber compound. The port-plates, which form the other walls of the piston-chamber, are made of metal. The extent of water-pressure in the piston-chamber varies; but it is necessary that the port-plates be stiff or rigid and strong, and my invention relates to port-plates in meters of this class made of vulcanized rubber or rubber compound and held or formed to be sufficiently rigid and strong. The rubber port-plates, when of some compositions and of suitable shape, may be made sufficiently strong to withstand the pressure without re-enforcing sections of metal, but as a rule I prefer to employ a composite plate of metal and rubber or rubber compound.

Figure 1:
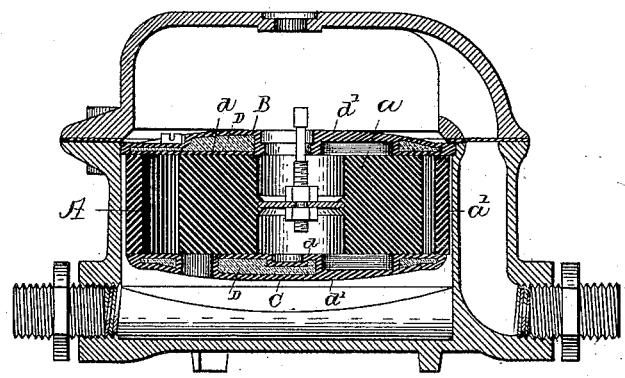
Figure 2:
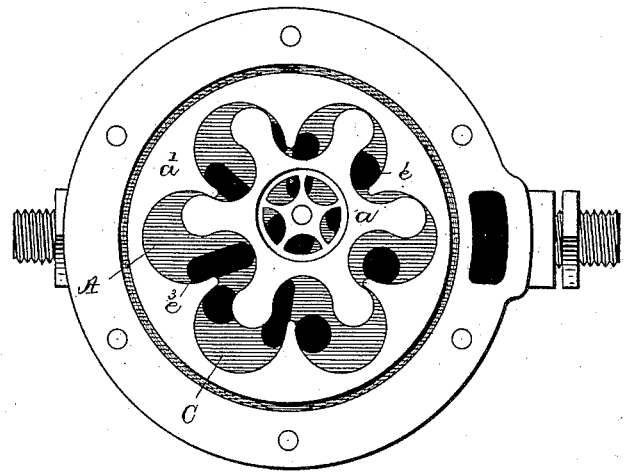
Figure 3:
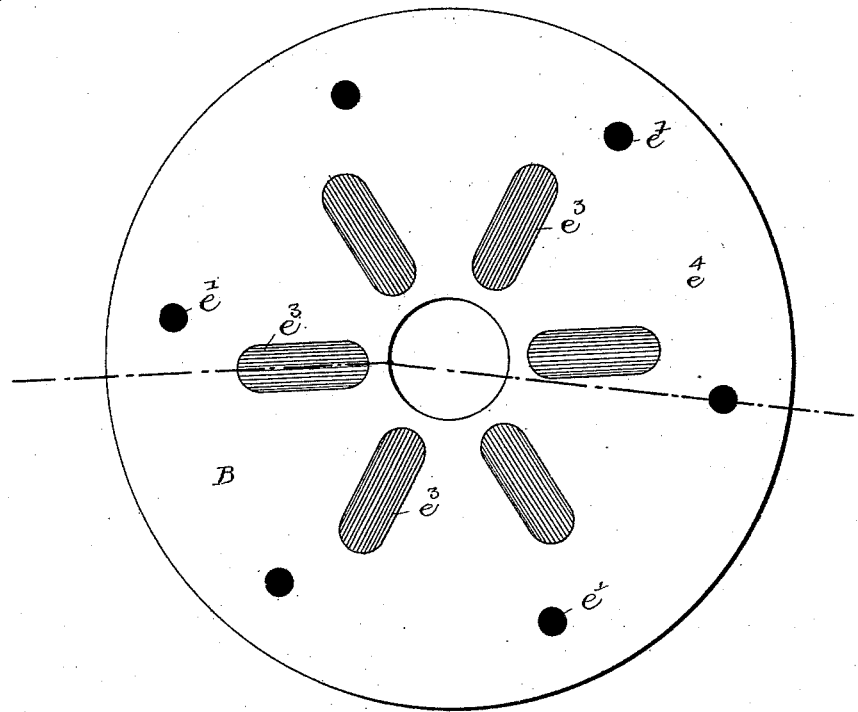
Figure 4:
Figure 5:
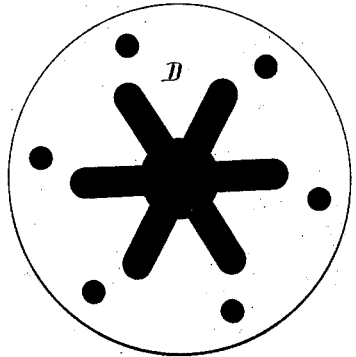
Figure 6:
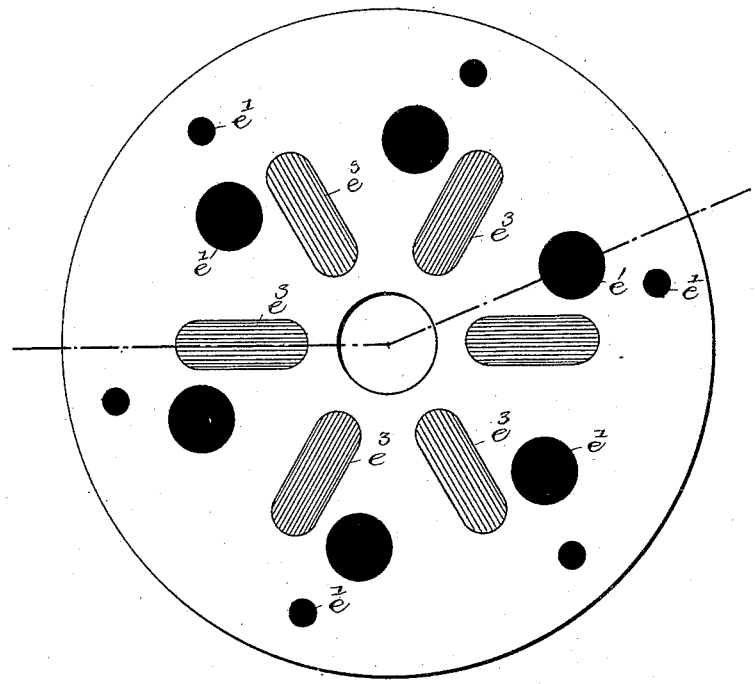
Figure 7:
Figure 8:
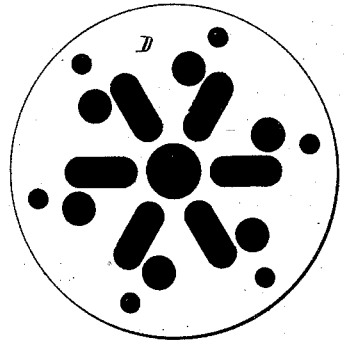
Figure 9:
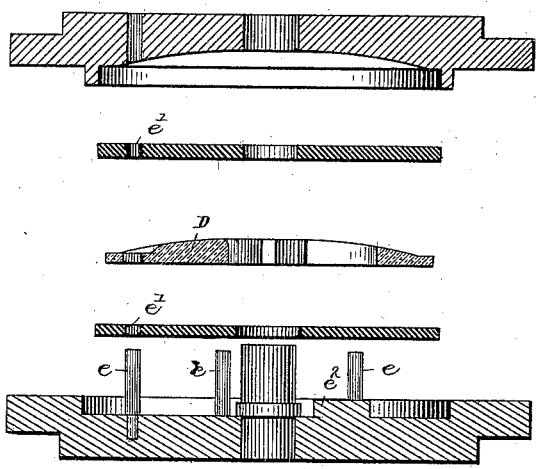
Figure 10:
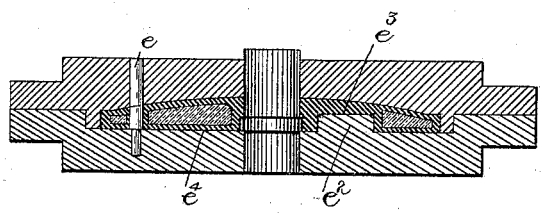

Referring to the drawings, Figure 1 is a view in vertical central section of the portions of a meter necessary for illustrating the invention. Fig. 2 is a view, principally in plan, below the upper port-plate. Fig. 3 is a view of the upper port-plate. Fig. 4 is a view in section upon the dotted line of Fig. 3. Fig. 5 is a view reduced in size of the spider or metal re-enforcing plate of the upper port-plate. Fig. 6 is a view in plan of the lower port-plate. Fig. 7 is a view in section upon the dotted line of Fig. 6. Fig. 8 is a view in plan reduced in size of the spider or metal re-enforcing plate of the lower port-plate. Fig. 9 represents in section a mold and various parts entering into a port-plate assembled before molding. Fig. 10 represents them as brought to shape by pressure and vulcanization in the mold.

A represents the piston-chamber of the meter; $a$, the hard-rubber piston; $a'$, the rubber ring, the inner side of which forms the wall of the piston-chamber; B, the upper port-plate, and C the lower port-plate. Each port-plate is represented as having its face $d$ and back $d'$ composed of hard vulcanized rubber or rubber compound and as having embodied in it a spider metal re-enforcing plate D, to which the rubber is intimately vulcanized and united, and which preferably is entirely covered by the rubber composition; but, as above stated, a rubber composition of diatomaceous silica largely in excess of the rubber of practically the shape represented in Figs. 2 and 3 and molded under sufficient pressure may be employed.

In making the form of port-plate represented in Figs. 4 and 7 I use a two-part mold. (See Figs. 9 and 10.) In one of the molds there is arranged to extend upward from its face metal rods or bars $e$ to form the holes $e'$ in the port-plate, and there are the projections $e^2$ to form the ports $e^3$. A sheet of rubber of proper thickness and form is then placed in the mold, the rods running through the rubber. The skeleton plate is then placed in the mold upon the rods. More rubber is then placed in the mold upon the rods and the upper part of the mold, which has holes through which the rods extend, placed over the assembled rubber and metal plate, and the hole is vulcanized under considerable pressure and when completed will have the smooth finished face $e^4$, the ports $e^3$, and the holes $e'$, by which they are fastened together and to the ring by means of screws or screw-rods, as described in said patent and as represented in Fig. 1. It will be seen that the entire surface of each port-plate, including, also, the surface and walls of the ports, is hard rubber or rubber compound, and that there is no section of the entire wall of the piston-chamber or piston that presents a metal surface upon which the sediment may be deposited from the passing water.

I prefer, in uniting the rubber compound to the metal plate, that the metal plate first be treated by being dipped in a copper-bath or otherwise prepared to receive the rubber compound in a manner well known to those skilled in the art of uniting rubber to metal.

Having thus fully described my invention, I claim and desire to secure by Letters Patent of the United States—

1. A port plate or plates for fluid-meters, comprising a metal spider or re-enforcing plate covered or faced with hard-rubber composition, as and for the purposes described.

2. The combination, in the port-plate of a fluid-meter, of a spider or skeleton metal plate approximating the form of the finished plate, and a hard-rubber compound rigidly secured to said plate, substantially as and for the purpose described.

HENRY D. WINTON.

In presence of—
F. F. RAYMOND, 2d,
J. M. DOLAN.